Feb. 20, 1968     C. E. CROWLEY     3,369,651

EYEGLASS CASE

Filed Aug. 8, 1966

INVENTOR.
Carolyn E. Crowley 3,369,651
EYEGLASS CASE
Carolyn E. Crowley, Montrose, N.Y., assignor to
Robert E. Crowley, Montrose, N.Y.
Filed Aug. 8, 1966, Ser. No. 570,905
2 Claims. (Cl. 206—5)

ABSTRACT OF THE DISCLOSURE

This is an eyeglass case of the sheath type provided with a cleaning means for one lens at a time as an indigenous part of the case. The cleaning elements are on opposable extensions above the opening and to one side of the case, their separation extended down by a slot into the body of the case. From the base of the slot to the regular corner of the opposite side a diagonal line of opening is thus provided which in combination with the extensions allows for the oblique insertion and polishing of the lens.

---

This invention relates to a new and useful eyeglass case and has as its objective the provision, as an integral part of such a case, of a simple and practical means for cleaning the lenses of the eyeglasses after their withdrawal from the case.

In the past, various attempts have been made at providing an eyeglass cleaning element as part of the eyeglass case. The advantages of having the immediate availability of a means of cleaning the eyeglasses as part of the case itself are obvious. Some of these proposals were simply attachments or accessories to the case. Others attempted a more integral relationship between the case and the cleaning element. These solutions have not been successful because they have usually resulted in making the case unduly bulky in attempting the incorporation of the cleaning element; weakening the case through various openings to allow the insertion of the eyeglasses for cleaning; or, in attempting to avoid these pitfalls, producing a case that is unduly expensive or impractical to manufacture.

A further object of this invention, therefore, it is to provide an eyeglass case with the lens cleaning elements harmoniously contained within the contours of the case, avoiding undue bulk, size, or unpleasing appearance.

A further object of this invention is to provide an eyeglass case having means for the ready and easy introduction of the eyeglass lens for cleaning.

A further object of this invention is to provide an eyeglass case, the cleaning portions of which through their novel disposition have ample flexibility and adaptability to properly engage eyeglass lenses of different shapes.

A further object of this invention is to provide an eyeglass case with self-contained cleaning elements that do not interfere with the proper insertion, removal or protection of the eyeglasses in the case itself.

These objects and advantages will be apparent from the following description when read in connection with the accompanying drawings of a preferred embodiment of the invention in which.

Figure 1:
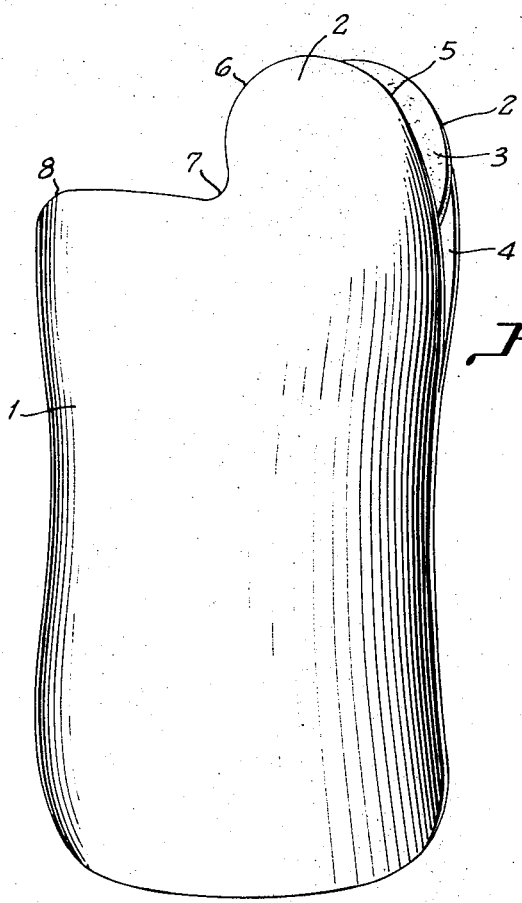
FIGURE 1 represents a plan view of the eyeglass case.
Figure 2:
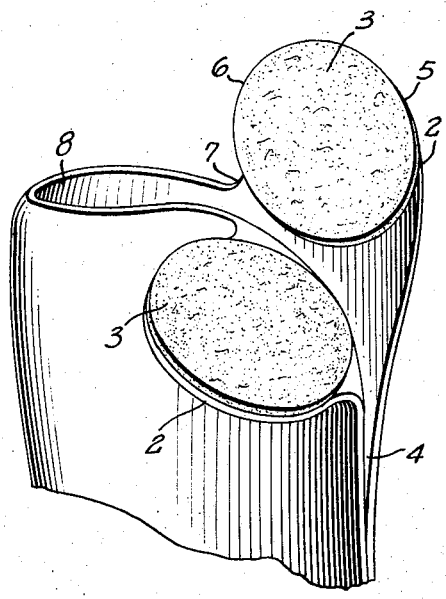
FIGURE 2 represents a view of the upper portion of the case with the extension pulled down to show the cleaning element.

Referring to the drawings in which like reference figures indicate like parts, 1 designates the eyeglass case proper, 2 the extensions, 3 the lens cleaning element, 4 the slot extending downward along the outer edge of the case, 5 the flatter arc portion of the contour of the extension, 6 the rounded curvature of the medial part of the contour, 7 the indentation in the contour where the extension joins the case, 8 the corner of the open end of the case.

The eyeglass case would normally be made of pliable material such as leather or plastic. The eyeglass cleaning element would be a suitable material and may be impregnated with chemicals that would facilitiate its function.

The novelty of these features and the advantages in their combination and mutual co-action will be apparent from the following:

A. The protective function of the eyeglass case is not impaired since only one side has a slot 4, the other side remaining intact, providing a firm supporting coverage throughout the long axis of the case and protecting the enclosed glasses.

B. The downward descending slot 4 increases the depth of opening between the extensions 2 reducing the need for their undue projection above the opening. Normally, such a projection of these extensions would be necessary to provide sufficient access to insert the eyeglass for cleaning. But by having the extensions and the slot on one side of the case, the access space for inertion of the eyeglass for cleaning is kept essentially within the case itself, while the supporting function of the case, as noted above, is not comprised. Actually, the disposition of the extension and the slot provides a selective access space. Thus, the smaller or rounder eyeglass can be introduced between the extensions in a line essentially parallel to the top of the case, while the larger, longer or oblique lenses found in the more stylized modern glasses can be introduced at an angle parallel the line 4 to 8. It can readily be seen that the oblique line 4 to 8 is greater than a straight horizontal line of opening across the top of the case alone. Thus through this relationship, a factor of selective access is provided so that the most efficient disposition of the lens in relation to the extension 2 and their cleaning elements 3 is provided to promote its cleaning by simply introducing it in a more oblique fashion along the line from the bottom of the slot 4 to opposite corner 8.

C. The character of the curvilinear contour in the extension is such that the flatter portion of the arc 5 readily adapts to the modern style of eyeglasses with their more oblique or narrower and longer lenses and their upper flatter edge. The more circular medial edge 6 of the extension fits the rounded corners of such lenses as well as smaller rounded lenses themselves. These remarks apply as well to the corresponding contour of the cleaning elements 3. The flattened arc 5 in the contour makes the extension less protrusive and more completely a part of the case thereby preventing bending and wear on this part. The indentation 7 produced by the medial curvature at the extension's junction with the case increases the flexibility of the extension as well as completing the roundness of curvature for adaptation to the lens as already described. The contour in its entirety blends harmoniously with the case proper and hence has the added virtue of a distinctive and pleasing appearance.

It is believed that this combination of features and their mutual interaction gives this eyeglass case advantages over the other attempts at solving this problem.

In use for cleaning, the eyeblasses are introduced one lens at a time. The fingers press the extension 2 together bringing the cleaning elements 3 against the surfaces of the lens. A combination of some rotary and back and forward motion cleans the lens. The same procedure is followed with the other lens.

For storage, the case is used in a standard manner with the eyeglasses inserted into the open end and sheathed. It is noted that having the cleaning extensions 2 offset to one side facilitates the ready insertion and withdrawal of the glasses.

Having described the invention, I claim the following:

1. An eyeglass case, comprising an envelope of pliable material, an opening at one end thereof; extensions at one side of the envelope above opening in flexible opposed relationship; lens cleaning elements on the inner surfaces of said extensions; a curvilinear contour in said extension, commencing in its outer aspect in a more flattened arc and increasing in curvatiure in its medial aspect; a slot along the outer edge of said envelope downwardly continuing the separation between said extensions into the body of said envelope.

2. An eyeglass case, comprising an envelope of pliable material, an opening at one end thereof; extensions at one side of the envelope above the opening in flexible opposed relationship; a curvilinear contour in said extension commencing in its outer aspect in a more flattened arc and increasing in curvature in its medial aspect; an indentation produced by said medial curvature at its junction with said envelope; lens cleaning elements on the inner surfaces of said extensions; a curvilinear contour in said lens cleaning element with a flattened arc at its upper border and increasing curvature at its medial aspect as in the contour of said extension; a slot along the outer edge of said envelope downwardly continuing the separation between the extensions into the body of said envelope.

References Cited

UNITED STATES PATENTS

| | | | |
|---|---|---|---|
| 421,438 | 2/1890 | Shailer | 206—5 |
| 2,554,630 | 5/1951 | Miller | 206—5 |

WILLIAM T. DIXSON, Jr., *Primary Examiner.*

THERON E. CONDON, *Examiner.*